(12) United States Patent
Chou et al.

(10) Patent No.: US 7,485,387 B2
(45) Date of Patent: Feb. 3, 2009

(54) FUEL CELL MODULE COMPATIBLE WITH A DRY CELL

(75) Inventors: Che-Ping Chou, Jhongli (TW); Chien-Fu Kuo, Jhongli (TW); Chia-Chieh Shen, Jhongli (TW); Tsong-Pyng Perng, Jhongli (TW); Fang-Bor Weng, Jhongli (TW); Ay Su, Jhongli (TW); Po-Hsien Chou, Jhongli (TW); Pai-Ho Hsu, Jhongli (TW)

(73) Assignee: Yuan Ze Univeersity, Jhongli, Taoyuan County (TW)

( * ) Notice: Subject to any disclaimer, the term of this patent is extended or adjusted under 35 U.S.C. 154(b) by 0 days.

(21) Appl. No.: 11/695,891

(22) Filed: Apr. 3, 2007

(65) Prior Publication Data

US 2008/0248367 A1 Oct. 9, 2008

(51) Int. Cl.
*H01M 8/02* (2006.01)
(52) U.S. Cl. .......................... 429/34; 429/27
(58) Field of Classification Search ............. 429/27, 429/44, 42, 38, 164
See application file for complete search history.

(56) References Cited

U.S. PATENT DOCUMENTS

2007/0141440 A1* 6/2007 Yang et al. .................... 429/38

* cited by examiner

*Primary Examiner*—Patrick Ryan
*Assistant Examiner*—Monique Wills
(74) *Attorney, Agent, or Firm*—Egbert Law Offices PLLC

(57) ABSTRACT

The present invention provides a fuel cell module compatible with a dry cell. The fuel cell module includes an enclosure, a power generating unit, a hydrogen storage unit and positive/negative output ends. The hollow enclosure has an internal space, and is provided with some preset through-holes, allowing external oxygen to enter into the space. The power generating unit and hydrogen storage unit are mounted into the space of the enclosure. Positive and negative output ends are placed at both sides or adjacent at one side of the enclosure, thereby guiding the positive and negative charge generated by the power generating unit; since the fuel cell modules are compatible with existing conventional dry cells. These modules are widely applied to existing electrical or electronic products.

3 Claims, 7 Drawing Sheets

FUEL CELL MODULE COMPATIBLE WITH A DRY CELL

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a fuel cell module, and more particularly to an innovative fuel cell module which is compatible with a conventional dry cell.

2. Description of Related Art Including Information Disclosed Under 37 CFR 1.97 and 37 CFR 1.98

A fuel cell is an environmental-friendly and highly flexible small power generator. Unlike a secondary cell, the fuel cell is a power generating device that can convert fuel into electric power in a very flexible and efficient manner without gas emission waste.

At present, several Taiwanese companies are engaged in producing fuel cells, of which the direct methanol fuel cell (DMFC) is a preferred option. Also, there is a proton exchange fuel cell (PEMFC), applied as the power source for motor vehicles. On a comparative basis, the DMFC has a higher catalyst cost and poorer conversion efficiency than the PEMFC, so there exists many uncertainties regarding the commercialization of the DMFC in the future. However, the main problem faced by the PEMFC is the difficulty of hydrogen storage, leading to impossible miniaturization. To sum up, the existing fuel cell techniques cannot meet the demand of the general public.

As for the present situation, compact electrical appliances and 3 C electronic products, such as recorders, laptops, mobile phones, PDA, MP3 and digital cameras, are usually energized by commercial power, and also provided with a space for accommodating dry cells. That is, most compact electrical appliances and 3 C electronic products are designed with a dry cell space. So, the fuel cell mentioned above faces the challenge of becoming compatible with existing dry cells in order to be able to be commercialized into a wide range of applications.

Thus, to overcome the aforementioned problems of the prior art, it would be an advancement in the art to provide an improved structure that can significantly improve efficacy.

To this end, the inventor has provided the present invention of practicability after deliberate design and evaluation based on years of experience in the production, development and design of related products.

BRIEF SUMMARY OF THE INVENTION

The fuel cell module of the present invention includes an enclosure, power generating unit, hydrogen storage unit and positive/negative output ends. These fuel cell modules are compatible with conventional dry cells. So, the fuel cell modules are widely applicable in existing electric or electrical products, so as to boost commercialization of the fuel cell.

Thanks to the advantages of higher generating capacity, working efficiency and high-quality current, the fuel cell of the present invention greatly improves the strength of the power supply and prolongs the service life of a portable power supply.

The fuel cell module of the present invention allows refills of hydrogen, after consumption. As compared with existing dry cells, the environmental-friendly fuel cell of the present invention helps to reduce the consumption of resources and waste.

Although the invention has been explained in relation to its preferred embodiment, it is to be understood that many other possible modifications and variations are made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
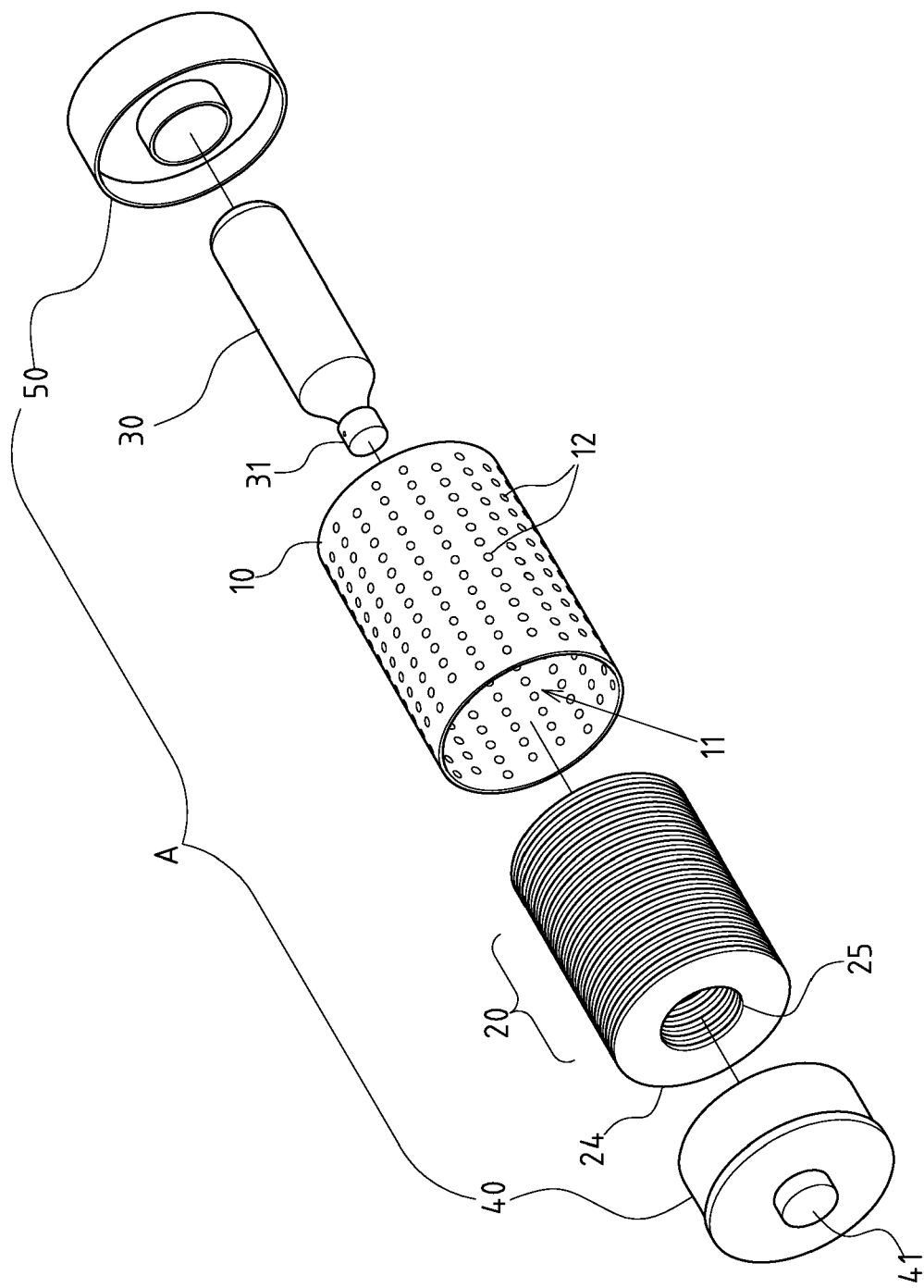
FIG. 1 shows an exploded perspective view of the preferred embodiment of the present invention.
Figure 2:
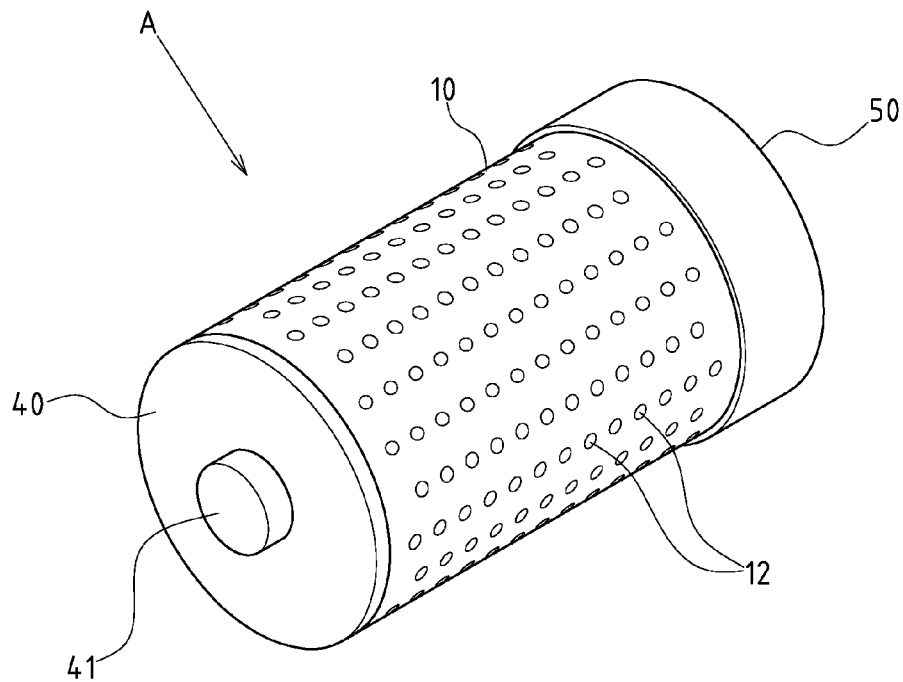
FIG. 2 shows an assembled perspective view of the preferred embodiment of the present invention.
Figure 3:
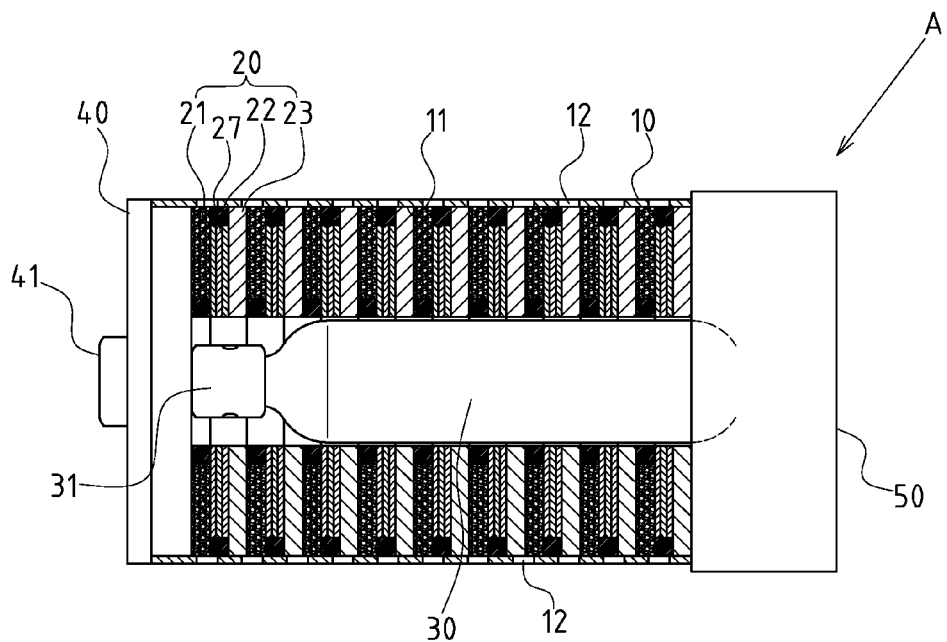
FIG. 3 shows a partial sectional view of the preferred embodiment of the present invention.

FIGS. 1, 2 and 3 depict a preferred embodiment of the improved fuel cell module of the present invention. The preferred embodiment is provided only for explanatory purposes. The scope of the patent is set by the claims.

The fuel cell module A comprises a hollow enclosure 10 with a space 11. The enclosure 10 is provided with some preset through-holes 12 allowing external oxygen to enter into the space 11. The enclosure 10 of the present invention is a plastic insulator (e.g. plastic steel).

The present invention also includes a power generating unit 20, which is placed at a preset location in the space 11 of enclosure 10. The power generating unit 20 of the present invention is composed of a diffusion layer 21, a membrane electrode assembly (MEA) 22 and a metal insulating layer 23. The power generating unit 20 is a circular structure comprising an external wall 24 and a central chute 25, such that the external wall 24 corresponds to the enclosure 10. The diffusion layer 21 and membrane electrode assembly (MEA) 22 are individually separated by internal and external baffle rings 26, 27 for guiding the flow of oxygen and hydrogen.

There is also a hydrogen storage unit 30, which is placed at a preset location in the space 11 of enclosure 10. The hydrogen storage unit 30 of the present invention is a cylinder and is placed within the central chute 25 of the power generating unit 20. A control valve 31 is mounted at one end of the hydrogen storage unit 30 to control the opening/closing of the hydrogen source.

A positive output end 40 is placed at one end of the enclosure 10 and is used to output the positive charge generated by power generating unit 20. The positive output end 40, made of conductive metal materials, is screwed onto one end of the enclosure 10. Moreover, a protruding portion 41 is arranged laterally onto the surface of positive output end 40, thus forming a positive pole of existing dry cells.

A negative output end 50 is placed at the other end of the enclosure 10, opposite to the positive output end 40, or together with the positive output end 40. The negative output end 50 is used to output the negative charge generated by the power generating unit 20. The negative output end 50, made of conductive metal materials, is screwed onto the other end of the enclosure 10.

Based upon above-specified structures, the fuel cell module A of the present invention is composed of an enclosure 10, a positive output end 40 and a negative output end 50, as in the same case of existing dry cells. A variety of dimensions may be made available for the fuel cell module, such module A2 and module A3, shown in FIGS. 5-6, making it possible to replace existing dry cells with these fuel cell modules of the present invention.

Figure 4:
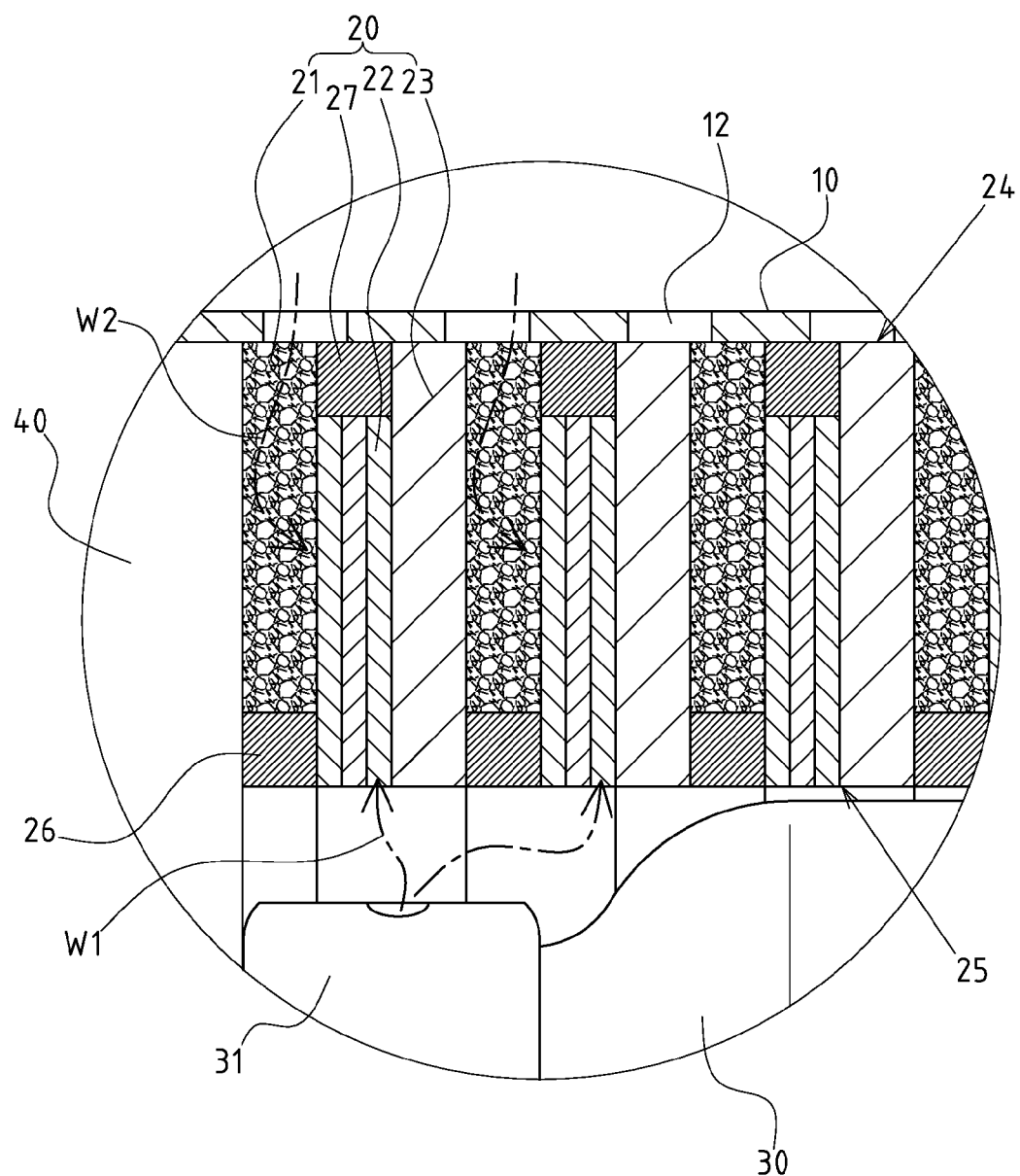
FIG. 4 shows an enlarged sectional view of location B of FIG. 3.

As for its internal structure, the hydrogen storage unit 30 is centrally assembled into the power generating unit 20. The hydrogen storage unit 30 is activated in several ways, for example, by pressing the control valve 31. Referring to FIG. 4, hydrogen W1 released from the control valve 31 of hydrogen storage unit 30 flows into membrane electrode assembly (MEA) 22 along the central chute 25 of power generating unit 20. External oxygen W2 flows into membrane electrode assembly (MEA) 22 via a through-hole 12 of the enclosure 10 and then the diffusion layer 21. Thus, oxygen W2 and hydrogen W1 may generate an electrochemical reaction and electrical power in the membrane electrode assembly (MEA) 22. Since the diffusion layer 21, membrane electrode assembly (MEA) 22 and metal insulating layer 23 constitute a unit similar to a power-generating cell, the laminated units generate electrical power in series. Furthermore, the positive and negative poles of power generating unit 20 output electrical power from the positive output end 40 and negative output end 50, as in the case of existing dry cells.

Figure 5:
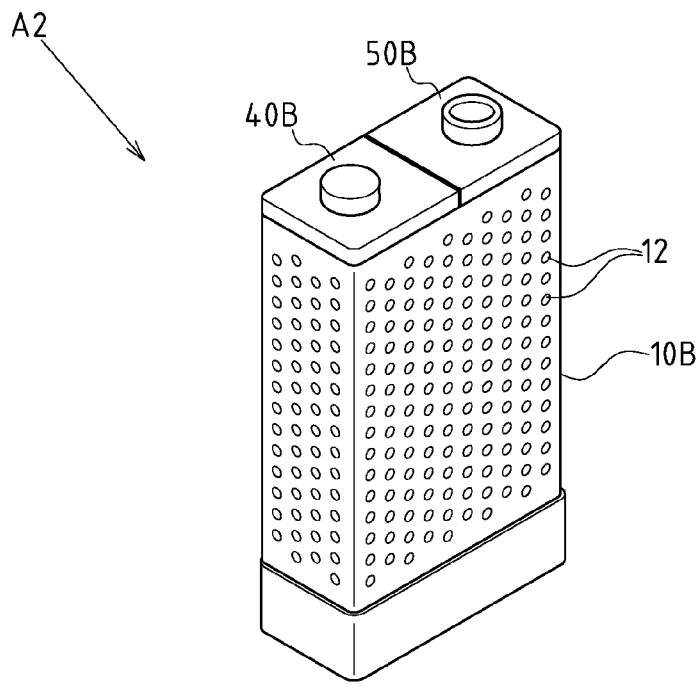
FIG. 5 shows a perspective view of another application of the present invention.
Figure 6:
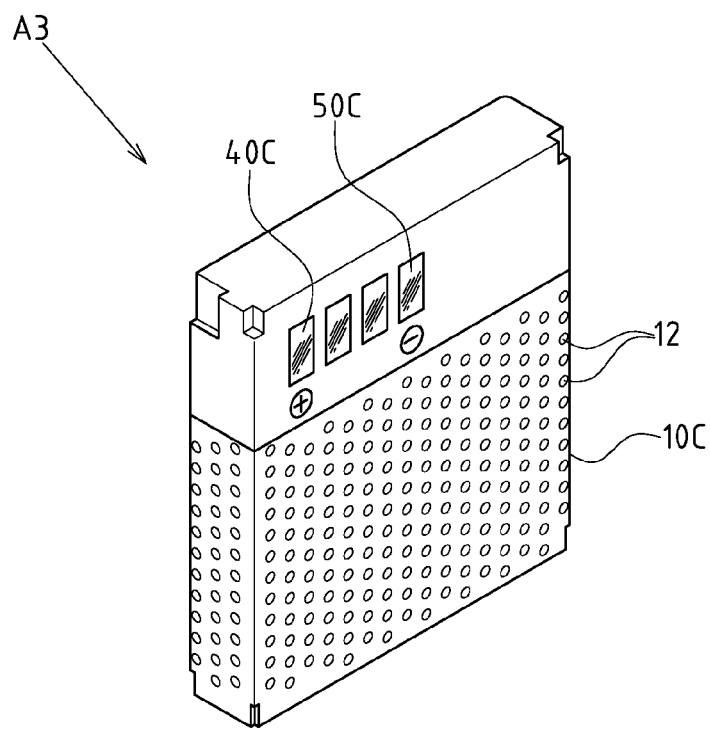
FIG. 6 shows a perspective view of another application of the present invention.

In addition to a cylindrical shape, the existing dry cell may be formed into other shapes, such as a rectangular shape. Referring to FIG. 5, the enclosure 10B of the fuel cell module A2 is a rectangular shape, while the positive output end 40B and negative output end 50B are arranged at the same end of the enclosure 10B to fit the existing model of dry cell. Referring to FIG. 6, the fuel cell module A3 imitates the shape of an existing lithium cell, and the enclosure 10C is an almost flat-type rectangular shape. The positive output end 40C and negative output end 50C are placed at intervals on the same side of enclosure 10B, such that the fuel cell module A3 can also replace the existing lithium cell.

Figure 7:
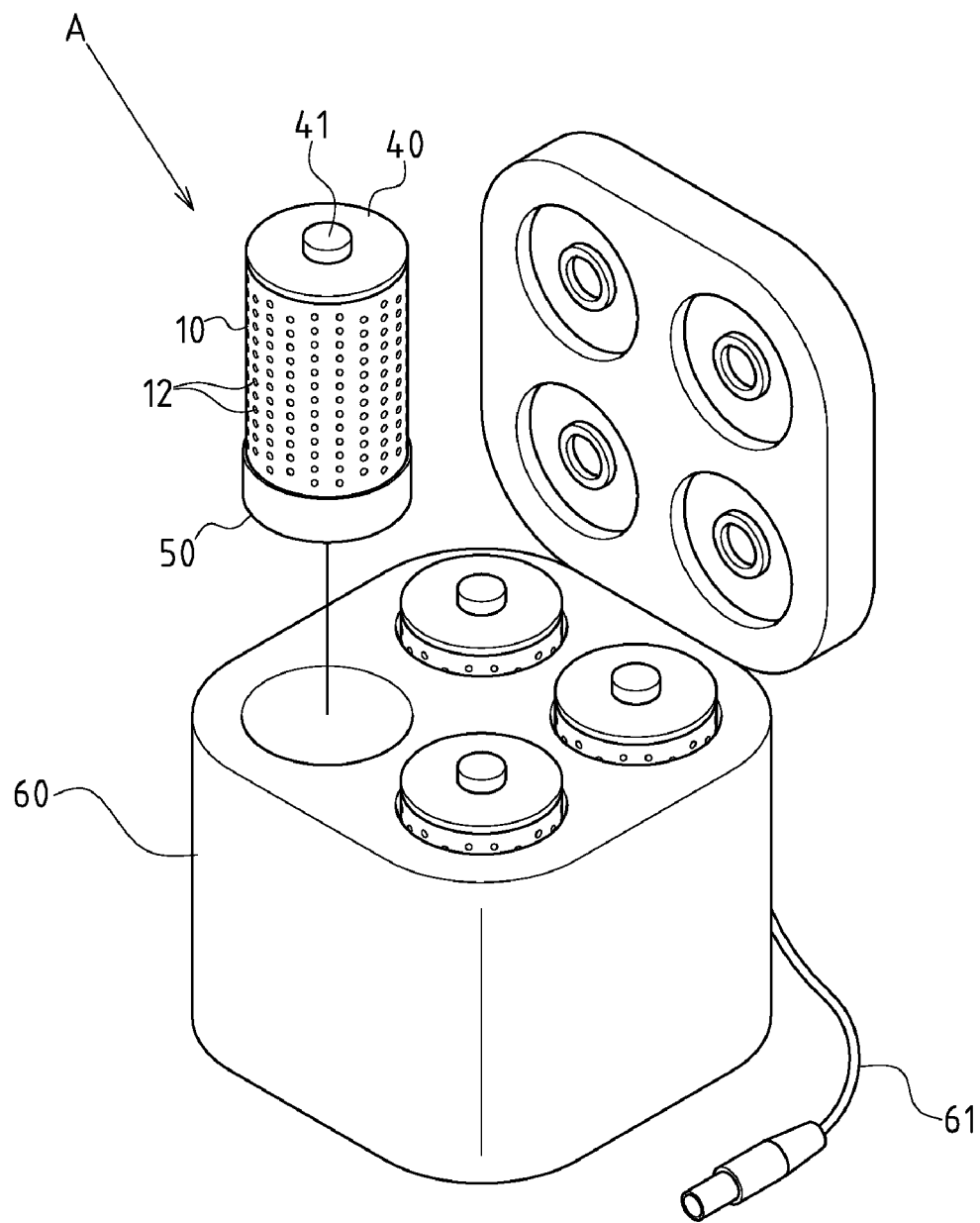
FIG. 7 shows a perspective view of integrating a fuel cell module into a power supply in the present invention.
Figure 8:
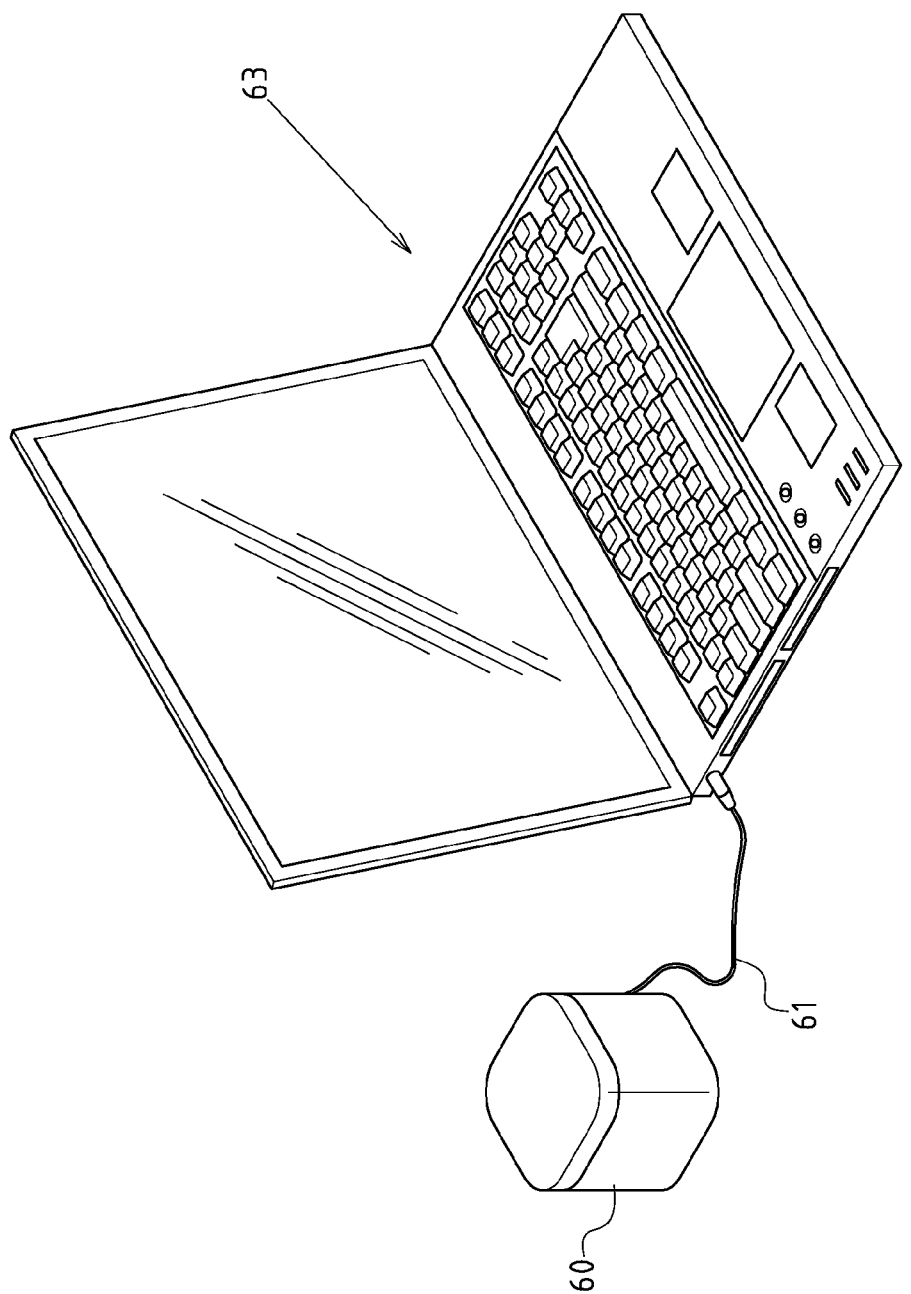
FIG. 8 shows a perspective view of connecting a power supply to electronic products disclosed in FIG. 7.

Referring to FIG. 7, several fuel cell modules A of the present invention can also be assembled into a single power supply with a container 60. The container 60 accommodates the electric wire 61. Referring to FIG. 8, said electric wire 61 is linked to electronic products 62, such as a laptop, as shown in the FIG. 8.

Figure 9:
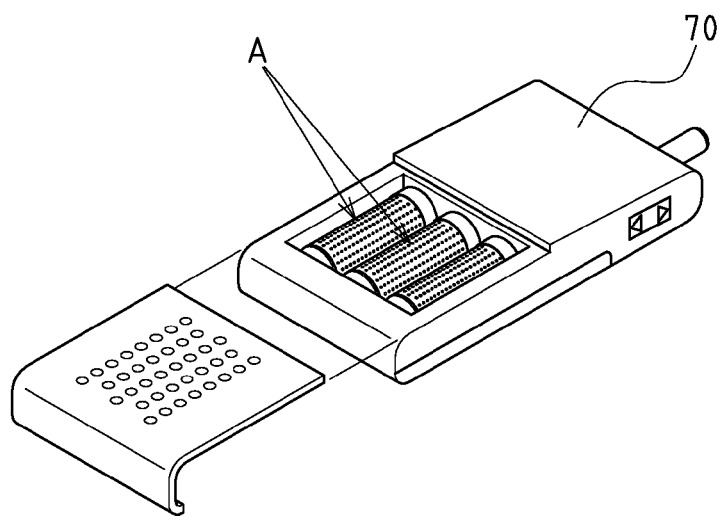
FIG. 9 shows a perspective view of application of the fuel cell module of the present invention in existing electronic products.
Figure 10:
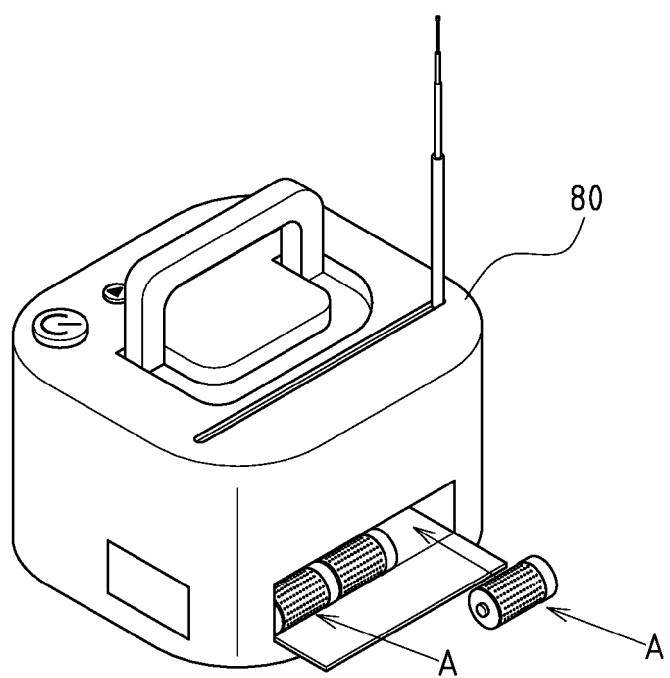
FIG. 10 shows a perspective view of application of the fuel cell module of the present invention in existing electric appliances.

Referring to FIGS. 9 and 10, the fuel cell module A of the present invention can replace existing dry cells as the power supply of currently available electric or electronic products. FIG. 9 depicts an electronic product 70, such as a PDA. FIG. 10 depicts an electric appliance 80 in the form of a recorder device. It is understood that the dry cell is referenced for a great number of commercially available electrical or electronic products.

We claim:

1. A fuel cell module comprising:
   a hollow enclosure having an internal space, said hollow enclosure having a plurality of trough holes formed through a wall thereof, said plurality of trough holes suitable for allowing oxygen to pass to said internal space, said hollow enclosure being formed of a polymeric material;
   a power generating unit positioned in said internal space of said hollow enclosure, said power generating unit having a diffusion layer and a metal conducting layer and a membrane electrode assembly sandwiched between said diffusion layer and said metal conducting layer, said diffusion layer and said metal conducting layer and said membrane electrode assembly extending radially relative to a longitudinal axis of said power generating unit, said power generating unit being a circular structure having an external wall and a central chute, said external wall positioned adjacent said wall of said hollow enclosure;
   a hydrogen storage unit positioned in said central chute within said internal space of said hollow enclosure;
   a positive output end affixed to one end of said hollow enclosure, said positive output end suitable for outputting a positive charge generated by said power generating unit; and
   a negative output end affixed to an opposite end of said hollow enclosure, said negative output end suitable for outputting a negative charge generated by said power generating unit.

2. The fuel cell module of claim 1, said hydrogen storage unit having a cylindrical shape.

3. The fuel cell module of claim 1, said hollow enclosure having a cylindrical shape.

* * * * *